United States Patent [19]

Liles et al.

[11] Patent Number: 5,001,187
[45] Date of Patent: Mar. 19, 1991

[54] EMULSIONS OF SILICONE ELASTOMER
[75] Inventors: Donald T. Liles; Carl J. Bilgrien; Chi-long Lee, all of Midland, Mich.
[73] Assignee: Dow Corning Corporation, Midland, Mich.
[21] Appl. No.: 422,193
[22] Filed: Oct. 16, 1989
[51] Int. Cl.[5] .............................................. C08K 5/01
[52] U.S. Cl. ..................................... 524/745; 524/837
[58] Field of Search ................................ 524/837, 745
[56] References Cited

U.S. PATENT DOCUMENTS

| | | | |
|---|---|---|---|
| 3,294,725 | 12/1966 | Findlay et al. | 260/29.2 |
| 3,398,178 | 8/1968 | Nelson | 260/448.2 |
| 3,445,495 | 5/1969 | Nelson | 260/448.2 |
| 3,694,427 | 9/1972 | Jones et al. | 260/185 |
| 4,496,687 | 1/1985 | Okada et al. | 524/745 |
| 4,618,645 | 10/1986 | Bauman et al. | 524/837 |

FOREIGN PATENT DOCUMENTS 1268400 11/1969 European Pat. Off. .

Primary Examiner—Melvyn I. Marquis
Assistant Examiner—Margaret Gass
Attorney, Agent, or Firm—Edward C. Elliott

[57] ABSTRACT

An aqueous, silicone emulsion of polydiorganosiloxane having silacyclobutane groups comprises the product obtained by the emulsion polymerization of a mixture of polydiorganosiloxane oligomer having hydroxyl endblocking and silacyclobutane containing silicone material. Adding a nucleophilic material to the emulsion produces an emulsion which yields an elastomer upon removal of the water from the emulsion. The elastomer from this emulsion can be reinforced by adding an aqueous, dispersed fume silica to the emulsion before removal of the water.

10 Claims, No Drawings

EMULSIONS OF SILICONE ELASTOMER

BACKGROUND OF THE INVENTION

1. Field of the Invention

This invention relates to silicone emulsions which yield an elastomer when the water is removed at room temperature. The silicone polymer in the emulsion contains silacyclobutane rings.

2. Background Information

Findley and Weyenberg disclose in U.S. Pat. No. 3,294,725, issued Dec. 27, 1966 a method of polymerizing siloxanes and silcarbanes in emulsion. The method emulsifies an organosiloxane oligomer in the presence of a surface active sulfonic acid catalyst.

U.S. Pat. No. 3,398,178, issued Aug. 20, 1968 to Nelson, polymerizes silacyclobutanes by reacting with a catalytic amount of halogenated silane, hydrohalic acid or aluminum halide to polymerize by opening the ring to form a polymer consisting essentially of

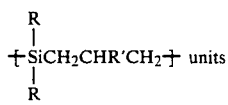

In U.S. Pat. No. 3,445,495, issued May 20, 1969, Nelson teaches the formation of similar polymers by polymerizing silacyclobutanes in the presence of a platinum catalyst.

Jones and Owen show alkoxy and amino silacyclobutanes in U.S. Pat. No. 3,687,995, issued Aug. 29, 1972, which they say may be reacted with organo-silicon materials containing SiOH groups and therefore may be useful as cross-linking agents. This use is claimed in U.S. Pat. No. 3,694,427. These compositions have the disadvantage of undergoing gradual increase in viscosity with time, requiring the components to be stored separately if spontaneous thickening is undesirable. Further, these formulations emit volatile condensation by-products.

SUMMARY OF THE INVENTION

An emulsion of a silicone polymer containing silacyclobutane groups is formed through the emulsion polymerization of a hydroxyl endblocked polydiorganosiloxane oligomer and difunctional silacyclobutane by using an anionic surfactant and water to form an emulsion, then polymerizing by adding a polymerization catalyst and neutralizing. The emulsion polymer can be crosslinked by adding a reagent which facilitates opening of the silacyclobutane ring. The emulsion forms an elastomer when water is removed by evaporation. The elastomer can be reinforced by the addition of aqueous, dispersed, fumed silica to the emulsion prior to removal of the water.

DESCRIPTION OF THE INVENTION

This invention relates to a method of producing an aqueous silicone emulsion of polydiorganosiloxane having silacyclobutane groups, said method comprising the steps of (A) homogenizing a mixture of (1) 100 parts by weight of hydroxyl endblocked polydiorganosiloxane oligomer of the formula

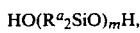

where $R^a$ is a monovalent radical and m is an integer of 3 to 500, (2) 0.1 to 5 parts of by weight of a silacyclobutane of the formula

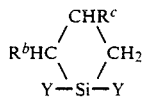

wherein Y is a radical or atom reactive with the SiOH group and selected from the group consisting of halogen,

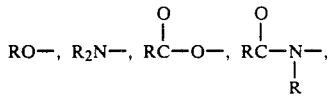

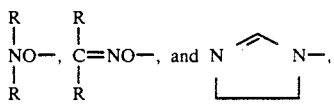

where R is a monovalent hydrocarbon radical of from 1 to 6 carbon atoms inclusive, and $R^b$ and $R^c$ are independently monovalent radicals, (3) water, and (4) surfactant, then (B) adding sufficient mineral acid or sulfonic acid to adjust the pH to less than 3, then (C) allowing the oligomer to polymerize to the desired degree, then (D) terminating polymerization by raising the pH to from 5 to 10 by addition of dilute alkali or amine, to give an aqueous silicone emulsion of polydiorganosiloxane having silacyclobutane groups.

This invention also relates to a method of producing an aqueous silicone emulsion which cures to an elastomer upon removal of the water, said method comprising mixing the emulsion as produced above with a nucleophilic compound of the formula $HONR_2$, where R is as defined above, that causes opening of the silacyclobutane ring and allowing the polydiorganosiloxane to crosslink.

The silacyclobutane functional polydiorganosiloxane copolymers can be made by emulsion polymerizing a polydiorganosiloxane oligomer of the formula $HO(R^a{}_2SiO)_mH$ with a silacyclobutane of the formula

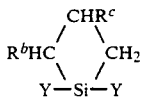

wherein Y is a radical or atom reactive with the SiOH group and selected from the group consisting of halogen,

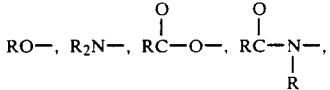

-continued

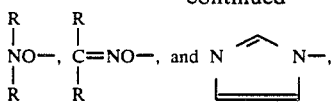

wherein R is a monovalent hydrocarbon radical of from 1 to 6 carbon atoms inclusive, $R^a$ is a monovalent hydrocarbon or substituted hydrocarbon radical of from 1 to 6 carbon atoms, and $R^b$ and $R^c$ are hydrogen, hydrocarbon radicals, or substituted hydrocarbon radicals, and wherein m is an integer of from three to five hundred. Preferably, m is about 35.

Exemplary of suitable monovalent radicals for the R, $R^a$, $R^b$, and $R^c$ groups are hydrocarbons and substituted hydrocarbons. Thus, for example, the groups can be alkyl such as methyl, ethyl, or propyl; substituted alkyl such as aminopropyl and thiopropyl; haloalkyl such as chloropropyl; aryl such as phenyl; unsaturated alkenyl such as vinyl, propenyl, and hexenyl; and unsaturated alkynyl such as acetylenyl and propynyl. $R^b$ and $R^c$ are preferably methyl or hydrogen and most preferably hydrogen.

Suitable halogens for Y are chlorine and bromine with the former preferred. Suitable RO— groups include CH$_3$O—, CH$_3$CH$_2$O—, and CH$_2$=C(CH$_3$)O—. Suitable R$_2$N— groups include H$_2$N— and (CH$_3$CH$_2$)$_2$N—.

Suitable

groups include

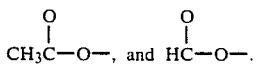

Suitable

groups include

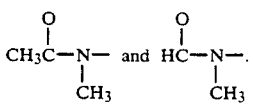

Suitable

groups include

Suitable

groups include $$\begin{array}{c} CH_3 \\ | \\ C=NO- \\ | \\ CH_2CH_3 \end{array}$$

The silacyclobutane can also be in the form of a cyclic siloxane of the formula

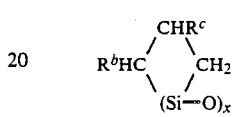

where x is an integer of 3 to 8. It can also be a copolymer having diorganosiloxy groups and silacyclobutane groups. This copolymer can have a cyclic structure or a linear structure with hydroxyl end groups. The preferred Y group is OCH$_3$.

The organic radicals of the polydiorganosiloxane oligomer (1) are preferably monovalent hydrocarbon radicals containing less than seven carbon atoms per radical and 2-(perfluoroalkyl)ethyl radicals containing less than seven carbon atoms per radical. The oligomer preferably contains methyl radicals. The oligomer can be any linear hydroxyl endblocked polydiorganosiloxane, but it should have a viscosity which is convenient to emulsify; such as below 0.5 Pa.s.

The surfactant is chosen so that it forms a stable emulsion and also allows the oligomer to be polymerized at a reasonable rate. The surfactant is an anionic surface active compound having a hydrophobic group attached to a hydrophilic group. The hydrophobic group is a hydrocarbon chain of greater than about 10 carbon atoms. The hydrophilic group is an anion such as sulfate, sulfonate, phosphonate, or carboxylate. The charge on the anion is balanced by a cation such as sodium or ammonium ion. A preferred surfactant is an alkyl sulfate, the preferred alkyl sulfate is sodium lauryl sulfate.

When sodium lauryl sulfate is used as the surfactant (4), the acid of step (B) is preferably a dilute mineral acid, such as hydrochloric acid. The dilute hydrochloric acid reacts with the sodium lauryl sulfate to give hydrogen lauryl sulfate, which is an active polymerization catalyst for the polydiorganosiloxane oligomer.

The surfactant of (4) can also be a surface active sulfonic acid such are described in U.S. Pat. No. 3,294,725, issued Dec. 27, 1966, to Findley and Weyenberg, which patent is hereby incorporated by reference to show suitable surfactants and polymerization catalysts for the emulsion polymerization of polydiorganosiloxane oligomer. When a surface active sulfonic acid such as a preferred dodecylbenzene sulfonic acid is used as surfactant (4), the pH of the mixture will be less than 3, so it is no longer necessary to add another acid as is called for in step (B) of this method.

In either case, the oligomers are then allowed to polymerize to the desired degree. This polymerization will take place over time at room temperature, one or two days is generally sufficient to yield a high molecular weight polymer. The molecular weight of the polymer is not critical, but should be greater than about 50,000 in order to obtain an elastomer with reasonable physical properties. The preferred molecular weight is from about 200,000 to 500,000. The polymerization rate can be raised by raising the temperature, however, this generates a higher level of cyclic siloxanes.

After the polymerization has proceeded to the desired degree, the polymerization is terminated by raising the pH of the emulsion to greater than 5, the preferred pH being about 8. The preferred method is the addition of dilute aqueous sodium hydroxide or an organic amine compound such as ammonia, diethylamine, or 2-amino-2-methyl-1-propanol. The preferred method uses a 10 percent aqueous ammonia solution.

The above emulsion of polydiorganosiloxane having silacyclobutane groups can be converted into an aqueous silicone emulsion which cures to an elastomer upon removal of the water by mixing it with a nucleophilic compound. Suitable nucleophilic compounds are the amines, hydroxyl amines, guanidine, N-alkylated guanidines, urea, and N-alkylated ureas. Preferred nucleophilic compounds are dialkylhydroxylamines, such as, diethylhydroxylamine and dibutylhydroxylamine, with the most preferred being diethylhydroxylamine. The amounts are not critical, from 0.5 to 5 parts by weight per 100 parts by weight of polymer are suitable. Preferred are from 1 to 2 parts by weight.

The emulsion forms an elastomer upon removal of the water. The emulsion can be used for release coatings, and hydrophobic protective coatings such as water repellents, and as fabric coatings.

The elastomer produced by removal of the water can be reinforced by the addition of aqueous, dispersed fume silica, such as CAB-O-SPERSE (®) F from Cabot Corporation. These materials are fumed silica which has been dispersed in water. The preferred amount is sufficient silica dispersion to give from about 5 to about 20 parts by weight of the fumed silica, on a dry basis, per 100 parts by weight of copolymer. The elastomer produced by removal of the water was not reinforced by use of a precipitated colloidal silica dispersion such as Nalco 1115 from Nalco Chemical Company.

Additives for modifying the properties of the elastomer produced upon removal of the water from the emulsion can include fillers such as ground quartz, carbon black, talc, calcium carbonate, diatomaceous earth, and alumina; pigments; thickeners; antifoams; and fungicides.

The following examples are included for illustrative purposes only and should not be construed as limiting the invention which is properly set forth in the appended claims.

EXAMPLE 1

A mixture was prepared by stirring together in a 2 liter beaker, 677.9 g of a hydroxyl endblocked polydimethylsiloxane, having a degree of polymerization of about 35, and 3.4 g of dimethoxysilacyclobutane. Then 25 g of a 35 percent aqueous solution of sodium lauryl sulfate and 325 g of deionized water were stirred in and stirring was continued for 30 minutes. The mixture was then homogenized by running through a single stage laboratory homogenizer at 7,500 psi to produce an oil in water emulsion having an average particle size of about 0.35 micrometers. This emulsion was then polymerized by adding 6 g of 4N hydrochloric acid to the emulsion and shaking for several minutes. The emulsion was then allowed to stand at room temperature for 20 hours to allow polymerization to take place. The emulsion polymerization was terminated by adding enough 20 percent aqueous diethylamine to raise the pH of the emulsion to between 6 and 8. The finished emulsion consisted of an approximately 68 percent by weight solids emulsion of hydroxyl endblocked copolymer of polydimethylsiloxy units and silacyclobutane units of the formula

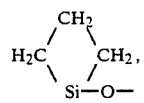

the copolymer having a weight average molecular weight of about 200,000.

Seven 25 g aliquots of the emulsion were then weighed into vials and the additives shown in Table I added to each vial in the amount shown, based upon weight of polymer. The vials were capped and shaken for several minutes, then stored at ambient conditions. Approximately 2 g samples were poured from each vial into a Petri dish after 1, 2, 4, and 7 days. The samples were allowed to dry for 24 hours at ambient conditions and inspected. The point at which the sample cured to an elastomer is noted in Table I.

TABLE I

| Additive | Concentration parts per hundred | Elastomer formed days |
| --- | --- | --- |
| Dioctytindilaurate, 58% | 0.5 | 7 |
| Stannous octoate | 0.5 | 7 |
| Ammonia, as aqueous soln. | 0.5 | 7 |
| Ethylmethylketoxime | 1.0 | 7 |
| Diethylhydroxylamine | 1.0 | 1 |
| 2-Amino-2-methyl-1-propanol | 2.0 | 7 |
| None | -.- | gum |

EXAMPLE 2

First 641.6 g of hydroxyl endblocked polydimethylsiloxane fluid with a degree of polymerization of about 35 and 6.48 g of dimethoxysilacyclobutane were weighed into a 2 liter beaker and the mixture was stirred for several minutes. Then 25 g of a 30 percent aqueous solution of sodium lauryl sulfate and 310 g of deionized water were weighed into the same beaker and this mixture was stirred for 30 minutes. The mixture was homogenized using a single stage laboratory homogenizer at 7,500 psi (three passes were made) to produce an oil in water emulsion. The emulsion was polymerized by adding 4 g of 4N hydrochloric acid to the emulsion and shaking it for several minutes in a closed container. The emulsion was allowed to stand at room temperature for 20 hours without agitation to complete the polymerization process. Emulsion polymerization was terminated by adding enough 10% aqueous ammonia to raise the pH of the emulsion to 7.5. This emulsion consisted of an approximately 62 percent by weight solids emulsion of hydroxyl endblocked polydimethylsiloxane/0.65 weight percent silacyclobutane functional siloxane copolymer.

To 100 g of the emulsion described above was added dropwise and with stirring, 0.62 g of diethylhydroxylamine (approximately 1 pph amine based on emulsion copolymer solids). The emulsion was stirred for an additional five minutes after all of the amine had been added. The emulsion was allowed to stand for 24 hours in a closed container after which a film of emulsion was poured into a Petri dish and the water was allowed to evaporate under ambient conditions. After 24 hours, the film was examined and it was elastomeric.

To two additional 100 g portions of the above described emulsion was added dropwise and with stirring 1.2 g of diethylhydroxylamine. The emulsions were allowed to remain undisturbed for 24 hours. To one emulsion was added with stirring and in a slow stream, 62 g of Nalco (®) 1115 colloidal silica. After adding all of the silica sol, the mixture was stirred for an additional five minutes, a small amount of the mixture was centrifuged to exclude air bubbles and a film was cast by pouring 8 g of the mixture into a 100 mm diameter Petri dish. The film was allowed to dry at ambient conditions for four days. To the other emulsion was added also with stirring and in a slow stream, 50.8 g of CAB-O-SPERSE (®) SC-2 aqueous, dispersed, fumed silica. A film from this emulsion was also cast and allowed to dry for four days. Both films consisted of crosslinked emulsion polymer filled with 15 pph silica, based on polymer weight.

The film that contained colloidal silica (Nalco (®) 1115) was extremely weak and it had almost no elongation, less than 100 percent. In fact, it was too weak to measure. However, a film from the unreinforced emulsion was elastomeric, having approximately 30 psi tensile strength and over 500 percent elongation. Thus filling this emulsion with colloidal silica had a negative or deleterious effect on mechanical properties of the resulting elastomer.

The film that contained aqueous, dispersed, fumed silica (CAB-O-SPERSE (®) SC-2) was considerably stronger and more elastomeric than the one filled with colloidal silica, as it had an ultimate tensile strength of 140 psi and an ultimate elongation of 540 percent. Thus aqueous, dispersed, fumed silica is a viable reinforcing filler for emulsions described in this invention.

That which is claimed is:

1. An aqueous silicone emulsion of polydiorganosiloxane having silacyclobutane groups comprising the product obtained by a method comprising the steps of
    (A) homogenizing a mixture of
        (1) 100 parts by weight of hydroxyl endblocked polydiorganosiloxane oligomer of the formula HO(R$^a$$_2$SiO)$_m$H, where R$^a$ is a monovalent radical and m is an integer of 3 to 500,
        (2) 0.1 to 5 parts by weight of a silacyclobutane of the formula

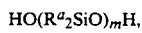
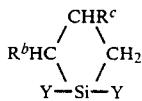

wherein Y is a radical or atom reactive with the SiOH group of the oligomer of part (1) and selected from the group consisting of halogen,

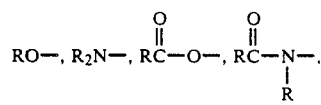
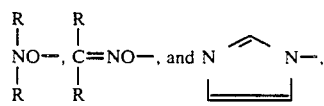

where R is a monovalent hydrocarbon radical of from 1 to 6 carbon atoms inclusive, and R$^b$ and R$^c$ are independently monovalent radicals,
        (3) water, and
        (4) surface active surfactant, then
    (B) adding sufficient mineral acid or sulfonic acid to adjust the pH to less than 3, then
    (C) allowing the oligomer to polymerize to the desired degree, then
    (D) terminating polymerization by raising the pH to from 5 to 10 by addition of dilute alkali or amine, to give an aqueous silicone emulsion of polydiorganosiloxane having silacyclobutane groups.

2. An aqueous silicone emulsion which cures to an elastomer upon removal of the water by evaporation said emulsion comprising the product obtained by mixing the emulsion of claim 1 with a nucleophilic compound that causes opening of the silacyclobutane ring and allowing the polydiorganosiloxane to crosslink.

3. The emulsion of claim 2 in which the nucleophilic compound is a dialkylhydroxylamine.

4. The emulsion of claim 3 in which the dialkylhydroxylamine is diethylhydroxylamine.

5. An aqueous silicone emulsion which cures to a reinforced elastomer upon removal of the water by evaporation, said emulsion comprising the product obtained by mixing the emulsion of claim 2 with an aqueous, dispersed fume silica.

6. A method of producing an aqueous silicone emulsion of polydiorganosiloxane having silacyclobutane groups, said method comprising the steps of
    (A) homogenizing a mixture of
        (1) 100 parts by weight of hydroxyl endblocked polydiorganosiloxane oligomer of the formula HO(R$^a$$_2$SiO)$_m$H, where R$^a$ is a monovalent radical and m is an integer of 3 to 500,
        (2) 0.1 to 5 parts by weight of a silacyclobutane of the formula

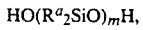
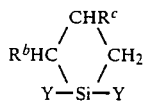

wherein Y is a radical or atom reactive with the SiOH group of the oligomer of part (1) and selected from the group consisting of halogen,

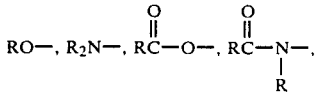

-continued

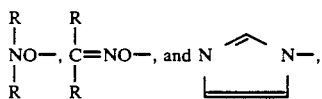

where R is a monovalent hydrocarbon radical of from 1 to 6 carbon atoms inclusive, and $R^b$ and $R^c$ are independently monovalent radicals, (3) water, and (4) surface active surfactant, then (B) adding sufficient mineral acid or sulfonic acid to adjust the pH to less than 3, then (C) allowing the oligomer to polymerize to the desired degree, then (D) terminating polymerization by raising the pH to from 5 to 10 by addition of dilute alkali or amine, to give an aqueous silicone emulsion of polydiorganosiloxane having silacyclobutane groups.

7. A method of producing an aqueous silicone emulsion which cures to an elastomer upon removal of the water by evaporation, said method comprising mixing the emulsion produced by the method of claim 6 with a nucleophilic compound that causes opening of the silacyclobutane ring and allowing the polydiorganosiloxane to crosslink.

8. The method of claim 7 in which the nucleophilic compound is a dialkylhydroxylamine.

9. The method of claim 8 in which the dialkylhydroxylamine is diethylhydroxylamine.

10. A method of producing an aqueous silicone emulsion which cures to a reinforced elastomer upon removal of the water by evaporation, said method comprising mixing the emulsion produced by the method of claim 7 with an aqueous, dispersed fume silica.

* * * * *